United States Patent
Hausmann et al.

(10) Patent No.: US 8,907,683 B2
(45) Date of Patent: Dec. 9, 2014

(54) DETECTION OF A CONTACTLESS DATA STORAGE DEVICE

(75) Inventors: Peter Hausmann, Pfaffhausen (CH); Marcel Plüss, Tann (CH); Matthias Schnaubelt, Lindau (CH)

(73) Assignee: LEGIC Identsystems AG (CH)

( * ) Notice: Subject to any disclaimer, the term of this patent is extended or adjusted under 35 U.S.C. 154(b) by 339 days.

(21) Appl. No.: 13/246,995

(22) Filed: Sep. 28, 2011

(65) Prior Publication Data

US 2012/0081131 A1    Apr. 5, 2012

(30) Foreign Application Priority Data

Sep. 30, 2010  (CH) ........................ 1594/10

(51) Int. Cl.
- *G01R 27/28* (2006.01)
- *H04B 5/00* (2006.01)
- *G06K 7/10* (2006.01)

(52) U.S. Cl.
CPC ............ *H04B 5/0062* (2013.01); *H04B 5/0081* (2013.01); *G06K 7/10128* (2013.01)
USPC .......................................... 324/654; 235/451

(58) Field of Classification Search
USPC ............... 324/309, 654; 340/572, 10.1, 10.4, 340/10.5; 343/702
See application file for complete search history.

(56) References Cited

U.S. PATENT DOCUMENTS

| | | | |
|---|---|---|---|
| 2004/0256460 A1* | 12/2004 | Charrat .......................... | 235/451 |
| 2005/0201450 A1* | 9/2005 | Volpi et al. .................... | 375/150 |
| 2007/0109102 A1* | 5/2007 | Friedrich et al. .............. | 340/10.4 |
| 2007/0188326 A1* | 8/2007 | Pluss et al. ................... | 340/572.4 |
| 2008/0088305 A1* | 4/2008 | Olson et al. ................... | 324/309 |
| 2009/0214037 A1* | 8/2009 | Tuttle ............................ | 380/270 |
| 2010/0013639 A1* | 1/2010 | Revert ......................... | 340/572.1 |
| 2010/0148936 A1* | 6/2010 | Pluss et al. ................... | 340/10.5 |
| 2010/0214177 A1* | 8/2010 | Parsche ........................ | 343/702 |

FOREIGN PATENT DOCUMENTS

| | | |
|---|---|---|
| DE | 60209386 | 3/2004 |
| EP | 1394720 | 11/2006 |
| WO | 2005-086069 | 9/2005 |

\* cited by examiner

*Primary Examiner* — Arleen M Vazquez
*Assistant Examiner* — Brent J Andrews
(74) *Attorney, Agent, or Firm* — Ostrolenk Faber LLP

(57) ABSTRACT

For detecting within a communication range of an antenna a contactless data storage device which is configured for inductive coupling with an electromagnetic field emitted by the antenna, a return signal is detected (S1) at the antenna during emission of an electromagnetic field pulse. During amplitude build-up of carrier oscillation at the beginning of the electromagnetic field pulse, an evaluation signal is generated (S2) based on the return signal, and the data storage device is detected (S3) based on the evaluation signal. By detecting the presence of the data storage device based on an evaluation signal generated during amplitude build-up, the detection of the data storage device can be initiated before carrier oscillation of the electromagnetic field pulse is stable. Consequently, the width of the electromagnetic field pulse can be shortened and, therefore, energy consumption for detecting the presence of the data storage device can be reduced.

18 Claims, 6 Drawing Sheets

DETECTION OF A CONTACTLESS DATA STORAGE DEVICE

CROSS REFERENCE TO RELATED APPLICATIONS

The present application claims priority from Switzerland application no. 01594/10 filed on Sep. 30, 2010, the content of which is hereby incorporated by reference into this application.

BACKGROUND

1. Field of the Disclosure

The present invention relates to a detection circuit and a method for detecting a contactless data storage device within a communication range of an antenna. Specifically, the present invention relates to a detection circuit and a method for detecting within a communication range of an antenna for emitting an electromagnetic field a contactless data storage device which is configured for inductive coupling with the electromagnetic field.

2. Related Art

Data storage devices such as smart cards or identification tags which can be accessed without any electrical contact for reading and/or writing purpose have become increasingly popular. Particularly, for person or product identification applications radio frequency identification (RFID) systems are in widespread use. In RFID systems, contactless communication between a contactless data storage device and a reader or read/write device is based on inductive coupling of a RF field, i.e. an electromagnetic field which is emitted by an antenna of the read/write device, and a conductive object, typically a coil integrated in the data storage device. Inductive coupling occurs within the communication range of the reader device, i.e. in the vicinity of the antenna, as soon as the RF field is switched on. Accordingly, for detecting, identifying and/or authenticating a passive contactless data storage device within the communication range of the read/write device, the RF field is switched on periodically, e.g. every 250 milliseconds, a modulated identification/authentication signal with a duration of a few milliseconds is emitted, and a response from the data storage device is detected. In setups where the read/write device is not connected to electrical power lines but relies on batteries, the periodic emission of the identification/authentication signal is inefficient because it consumes too much electrical power, particularly, when no data storage device is present. Ideally, the identification/authentication signal would only be emitted, if a contactless data storage device is present within the communication range of the read/write device.

WO 03/052672 describes a contactless integrated circuit reader comprising a tuned antenna for emitting a magnetic field and means for detecting the presence of a contactless integrated circuit, comprising a coil, within a communication perimeter of the reader. According to WO 03/052672, short magnetic field pulses having a duration of 10-50 μs are emitted and by way of a data receiving circuit, which comprises a rectifying diode and a low pass filter, an envelope signal having envelope pulses corresponding to the magnetic field pulses is extracted at the antenna. The amplitude of the envelope pulses is monitored and, if at least one envelope pulse has an amplitude below a detection threshold, an object is assumed to have been introduced into the communication perimeter. Subsequently, a normal identification/authentication request signal is emitted so as to determine whether the object that has entered the communication perimeter is a contactless device or not. The method of WO 03/052672 requires a receiving circuit to generate the envelope pulses, before the presence of a contactless device can be detected.

U.S. Pat. No. 7,598,872 describes a method for detecting identification media within the communication range of an antenna for transmitting and receiving RF signals of a read/write unit which operates in accordance with the principle of inductive coupling of an RF field in the MHz frequency band, e.g. 10 MHz. According to U.S. Pat. No. 7,598,872 a short polling signal, e.g. 5 μs, which is much shorter than the normal identification/authentication signal and contains a number of fundamental (carrier) oscillations of the RF field, is periodically emitted via the antenna. In order to avoid the transient phase of amplitude build-up of the carrier oscillation at the beginning of the polling signal, a return signal with a number of stable fundamental oscillations of the RF field is detected at the antenna at a defined time delay, after the beginning of the emission of the polling signal, for example, in the second half of the polling signal, e.g. after a time delay of 3 μs. Subsequently, the detected return signal is compared to a reference signal, and if the return signal differs from the reference signal, an identification medium is assumed to be within the communication range of the antenna, and a normal identification/authentication request signal is emitted for detecting, identifying and/or authenticating the identification medium. Within the delay time, settling processes can take place so that in the detected measurement range the detected return signal includes only stable fundamental oscillations. On one hand, limiting the return signal to stable oscillations requires a time delay in the detection process; while on the other hand, the return signal can be compared to the reference signal, before the end of the polling signal.

SUMMARY

It is an object of this invention to provide a detection circuit and a method for detecting within a communication range of an antenna, for emitting an electromagnetic field, a contactless data storage device, configured for inductive coupling with the electromagnetic field, which detection circuit and detection method do not have at least some of the shortcomings of the prior art. In particular, it is an object of the present invention to provide a detection circuit and a detection method which do not necessarily require receiving circuits to generate envelope pulses, before the presence of a contactless device can be detected. In particular, it is another object of the present invention to provide a detection circuit and a detection method which do not require a time delay for limiting the detection to stable carrier oscillations.

According to the present invention, these objects are achieved through the features of the independent claims. In addition, further advantageous embodiments follow from the dependent claims and the description.

A contactless data storage device, e.g. an identification medium, is configured for inductive coupling with an electromagnetic field emitted by an antenna, e.g. an antenna of a reader or read/write device. For detecting the contactless data storage device within a communication range of the antenna, a detection circuit has a connector for connecting to the antenna and for detecting a return signal at the antenna during emission of an electromagnetic field pulse. In the present context, the term "return signal" refers to a signal which is the sum of forward and reflected wave (at the antenna).

According to the present invention, the above-mentioned objects are particularly achieved in that the detection circuit for detecting the contactless data storage device within the communication range of the antenna is further configured to generate, during amplitude build-up of carrier oscillation at the beginning of the electromagnetic field pulse, an evaluation signal based on the return signal, and to detect the data storage device within the communication range based on a threshold value and the evaluation signal generated during the amplitude build-up. By detecting the presence of the data storage device based on an evaluation signal generated in the transient phase of amplitude build-up of the carrier oscillation at the beginning of the electromagnetic field pulse, the detection of the data storage device can be initiated before carrier oscillation of the electromagnetic field pulse is stable. Consequently, the width of the electromagnetic field pulse can be shortened and, therefore, energy consumption for detecting the presence of the data storage device can be reduced.

In a preferred embodiment, the detection circuit is configured to determine based on the evaluation signal the slope of the amplitude build-up, and to detect the data storage device within the communication range based on the threshold value and the slope of the amplitude build-up. Specifically, the data storage device is detected when the slope of the amplitude build-up significantly changes (decreases or increases) between consecutive electromagnetic field pulses.

In a further preferred embodiment, the detection circuit is configured to generate the evaluation signal as a comparative signal, during amplitude build-up of the carrier oscillation at the beginning of the electromagnetic field pulse, based on a comparison of the return signal and a comparative value, and to detect the presence of the data storage device based on the comparative signal generated during the amplitude build-up and the threshold value.

In an embodiment, the detection circuit is configured to generate the comparative signal to indicate exceeding oscillations of the return signal, exceeding oscillations having in each case an amplitude greater than the comparative value, and to detect the presence of the data storage device based on the number of exceeding oscillations within a defined time interval during the amplitude build-up. Essentially, the number of exceeding oscillations within the defined time interval during the amplitude build-up is a measure of the slope of the amplitude build-up.

In a further embodiment, the detection circuit comprises an Analog-Digital-converter and a Villard circuit for connecting the antenna to an input of the Analog-Digital-converter. The Villard circuit is configured to generate the evaluation signal, during amplitude build-up of carrier oscillation at the beginning of the electromagnetic field pulse, through transposition of the return signal from the antenna to a defined operating range of the Analog-Digital-converter. The detection circuit is configured to detect the presence of the data storage device based on a digital value generated by the Analog-Digital-converter from the evaluation signal provided at a defined point in time during amplitude build-up. Accordingly, the Villard circuit provides a measure of the return signal by building up a respective charge in a capacitor, and the value of the built-up charge at a defined point in time during amplitude build-up is a measure of the slope of the amplitude build-up.

In another embodiment, the detection circuit is configured to generate the comparative signal to indicate the phasing of the return signal, to determine a phase shift between the comparative signal and carrier oscillations of the electromagnetic field pulses, and to detect the presence of the data storage device based on the phase shift and the threshold value.

In a variant, the detection circuit comprises an Exclusive-Or element for generating from the comparative signal and the carrier oscillation of the electromagnetic field pulses a phase signal indicative of the phase shift between the comparative signal and the carrier oscillation of the electromagnetic field pulses, and the detection circuit is configured to determine for an electromagnetic field pulse an average phase shift from the phase signal, and to detect the presence of the data storage device based on the average phase shift of electromagnetic field pulses and the threshold value.

Preferably, the detection circuit is configured to detect the data storage device based on an upper threshold value, indicative of a reinforcing effect of an object in the communication range, and a lower threshold value, indicative of an attenuating effect of an object in the communication range. For example, a slope of the amplitude build-up greater than the upper threshold value indicates the reinforcing effect of an object in the communication range, whereas a slope of the amplitude build-up smaller than the lower threshold value indicates the attenuating effect of an object in the communication range. Specifically, a number of exceeding oscillations above the upper threshold value indicates the reinforcing effect of a present object, whereas a number of exceeding oscillations below the lower threshold value indicates the attenuating effect of a present object. Accordingly, a phase shift above the upper threshold value indicates the reinforcing effect of a present object, whereas a phase shift below the lower threshold value indicates the attenuating effect of a present object.

Preferably, the detection circuit is configured to define dynamically threshold values depending on the evaluation signal generated during the amplitude build-up of a previously emitted electromagnetic field pulse.

In addition to the detection circuit for detecting the contactless data storage device within the communication range of the antenna, the present invention further relates to a method of detecting within the communication range of an antenna for emitting an electromagnetic field a contactless data storage device which is configured for inductive coupling with the electromagnetic field. During emission of an electromagnetic field pulse, a return signal is detected at the antenna. During amplitude build-up of the carrier oscillation at the beginning of the electromagnetic field pulse, an evaluation signal is generated based on the return signal. The data storage device is detected within the communication range based on a threshold value and the evaluation signal generated during the amplitude build-up.

Preferably, the slope of the amplitude build-up is determined based on the evaluation signal, and the data storage device is detected within the communication range based on the threshold value and the slope of the amplitude build-up.

In an embodiment, the evaluation signal is generated as a comparative signal, during amplitude build-up of the carrier oscillation at the beginning of the electromagnetic field pulse, based on a comparison of the return signal and a comparative value. In a variant, the comparative signal indicates exceeding oscillations of the return signal having an amplitude greater than the comparative value, and the presence of the data storage device is detected based on the number of exceeding oscillations within a defined time interval during the amplitude build-up. In another variant, the comparative signal indicates the phasing of the return signal. The phase shift between the comparative signal and carrier oscillations of the electromagnetic field pulses are determined, and the presence of the data storage device is detected based on the phase shift and the threshold value.

In another embodiment, the antenna is connected via a Villard circuit to an input of an Analog-Digital-converter, and the evaluation signal is generated, during amplitude build-up of the carrier oscillation at the beginning of the electromagnetic field pulse, by the Villard circuit performing current integration and transposition of the return signal from the antenna to a defined operating range of the Analog-Digital-converter. The presence of the data storage device is detected based on a digital value generated by the Analog-Digital-converter from the evaluation signal provided at a defined point in time during amplitude build-up.

BRIEF DESCRIPTION OF THE DRAWINGS

The present invention will be explained in more detail, by way of example, with reference to the drawings in which.

DETAILED DESCRIPTION OF THE EMBODIMENTS

Figure 1:
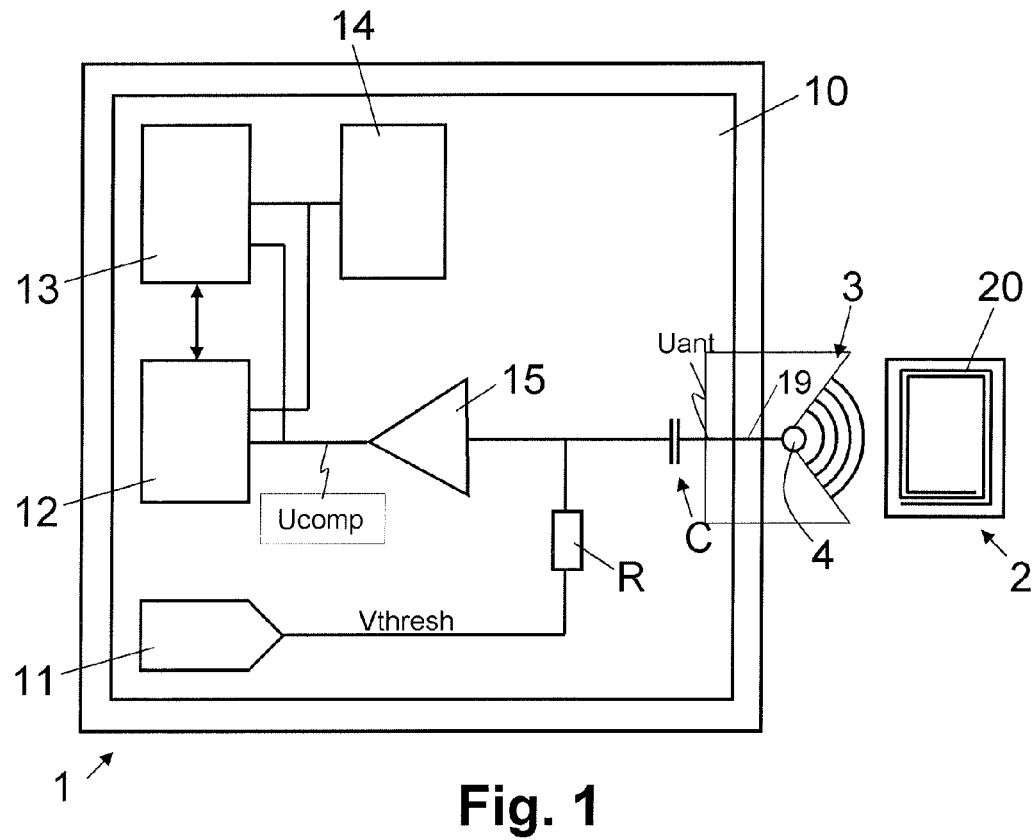
FIG. 1: shows a block diagram illustrating schematically a read/write device with a detection circuit for detecting a contactless data storage device within the communication range of an antenna of the read/write device.
Figure 3:
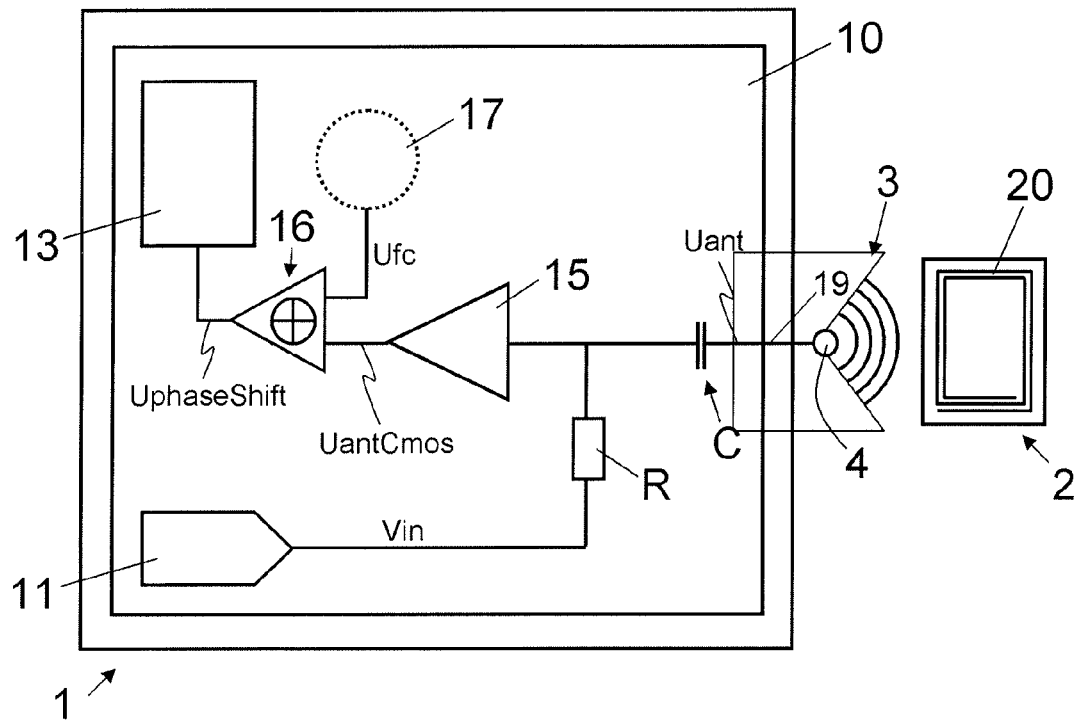
FIG. 3: shows a block diagram illustrating schematically a read/write device with another embodiment of a detection circuit for detecting a contactless data storage device within the communication range of the antenna.
Figure 6:
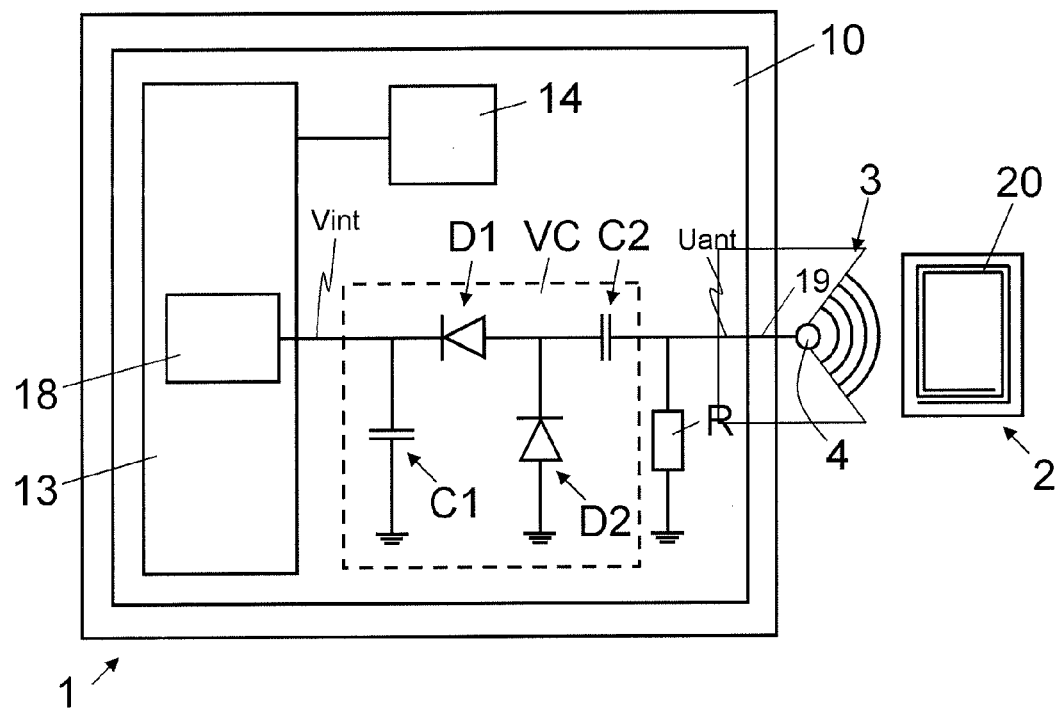
FIG. 6: shows a block diagram illustrating schematically a read/write device with an embodiment of the detection circuit having a Villard circuit for integrating the return signal.

In FIGS. 1, 3 and 6, reference numeral 1 refers to a reader and/or a read/write device, hereinafter collectively referred to as "reader", configured and operable to read and/or write data from/to a contactless data storage device 2 through inductive coupling with an electromagnetic field or an electromagnetic field pulse emitted by the antenna 4 of the reader 1.

As illustrated schematically in FIGS. 1, 3 and 6, the contactless data storage device 2, hereinafter referred to as "contactless device", comprises an antenna coil 20 for inductive coupling with the electromagnetic field of the reader 1. The antenna coil 20 is connected to a microchip which includes a data store containing stored data, e.g. product or user identification data. For example, the contactless device is an RFID tag or an RFID transponder, implemented in the form of a label, (smart) card, bracelet, key tag, etc. For example, the reader 1 is an RFID reader interacting with the contactless device 2 according to a standardized RFID protocol as defined in standards such as ISO 18092, ISO 15693, or ISO 14443, or according to a proprietary data transmission or RFID protocol. For example, the reader 1 is operating with an electromagnetic field 3 or electromagnetic field pulses 30 having a carrier frequency in the range of 100 KHz to 2.5 GHz. Particularly, the carrier frequency is set to the working frequency of an RFID system, e.g. 6.78 MHz, 13.56 MHz, or 27.12 MHz (or another multiple of 13.56 MHz).

As illustrated schematically in FIGS. 1, 3 and 6, the reader comprises a detection circuit 10 for detecting the presence of a contactless device 2 within the RF communication range of the reader 1 or its antenna 4, respectively. The detection circuit 10 is connected electrically via a connector 19 to the antenna 4 for detecting a return signal during a short electromagnetic field pulse 30, emitted by the reader 1 as a polling signal via its antenna 4, as will explained below in more detail. Furthermore, the detection circuit 10 comprises a processing unit 13 for determining whether there is a contactless device 2 in the communication range, by processing the detected return signal or a corresponding signal or value derived from the return signal by various circuits and/or components. For example, the processing unit 13 comprises a microprocessor with stored program modules, or another programmed logic unit.

In the embodiment of FIG. 1, the detection circuit 10 further comprises an input buffer 15, an RC-circuit for connecting the input buffer 15 to the antenna 4, a counter 12 connected to the output of the input buffer 15 and to the processing unit 13, a timer 14 connected to the counter 12 and the processing unit 13, and a threshold module 11 connected to the input buffer 15. As shown in FIG. 1, the antenna 4 is connected via capacitor C to the input of the input buffer 15.

The threshold module 11, e.g. a Digital/Analog converter, is connected via resistor R to the input of the input buffer 15 and configured to set a threshold voltage Vthresh. In a variant, the threshold module 11 is part of the processing unit 13. Preferably, the input buffer 15 is configured as a hysteresis input buffer generating a comparative output signal Ucomp with a high output level when the antenna voltage Uant exceeds the comparative value set by the threshold voltage Vthresh, and a low output level when the antenna voltage Uant reverts to a level at or below the comparative value set by the threshold voltage Vthresh, e.g. zero.

For example, the electromagnetic field pulse 30 has a pulse width tp which is set, for example, to a length or duration in the range of 1 µs to 5 µs, e.g. 3 µs, and is thus considerably shorter than a normal identification or authentication signal of a standard RFID reader which is typically in the order of a few milliseconds. As is illustrated schematically, in FIGS. 2a, 2b, 2c, 5a, 5b and 5c, the electromagnetic field pulse 30 (polling signal) has a transient amplitude build-up phase at the beginning of the electromagnetic field pulse 30 where carrier oscillations of the electromagnetic field pulse 30 build up their amplitude to the full maximum amplitude A of stable oscillations at time ta, e.g. ta≥500 ns. As will be outlined below, the return signal Uant detected at the antenna 4 will be evaluated and analyzed during the amplitude build-up, within an evaluation time interval [0, tm].

Generally, the relationship between the evaluation time (interval) tm, the amplitude build-up time ta (i.e. the rise time), and the pulse width tp is defined as tm≤ta≤tp. However, for a slow build-up time ta, e.g. ta≥2 µs, depending on the Q-rating of the antenna, the measurement may be initiated at a time ta' during amplitude build-up, before the full maximum amplitude A of stable oscillations is reached at time ta. Preferably, the evaluation time tm and the pulse width tp have the same duration tm=tp. In a preferred configuration, the evaluation time tm, the amplitude build-up time ta (rise time), and the pulse width tp have the same duration tm=ta=tp, e.g. tm=ta=tp=2 µs or tm=ta=tp=3 µs; or for slow rising scenarios tm=ta'=tp, e.g. tm=ta'=tp=2 µs or tm=ta'=tp=3 µs. Table 1, summarizes the various configurations for different embodiment scenarios:

TABLE 1

| Configuration | Corresponding scenario |
| --- | --- |
| tm < ta and ta < tp | Evaluation occurs during amplitude build-up, before stable oscillation is reached. The magnetic field pulse includes stable oscillations. |
| tm = ta and ta < tp | Evaluation occurs during amplitude build-up, until stable oscillation is reached. The magnetic field pulse includes stable oscillations. |
| tm < ta and ta = tp | Evaluation occurs during amplitude build-up, before stable oscillation is reached. The magnetic field pulse includes only the amplitude build-up, without any stable oscillations. |
| tm = ta = tp | Evaluation occurs during amplitude build-up, until stable oscillation is reached. The magnetic field pulse includes only the amplitude build-up, without any stable oscillations. |
| tm = tp = ta' < ta | Evaluation occurs during amplitude build-up, before stable oscillation is reached. The magnetic field pulse includes only part of the amplitude build-up, without any stable oscillations. |

The counter 12 is configured to count the number of oscillations of the return signal that exceed the voltage threshold Vthresh during the transient amplitude build-up phase [0, ta] of the electromagnetic field pulse 30 of the reader's polling signal, within a defined time period tm from the beginning of the electromagnetic field pulse 30.

At the end of the defined time period tm, the number of exceeding oscillations are read by the processing unit 13 and the counter 12 is reset, for example. Subsequently, the processing unit 13 determines whether or not a contactless device 2 (or another object) is within the antenna's communication range by comparing the current number of oscillations to an upper threshold, indicative of a reinforcing effect of an object within the communication range, and to a lower threshold, indicative of an attenuating effect of an object within the communication range. It is pointed out that the number of exceeding oscillations is also a measure and indicator for the slope of amplitude build-up at the beginning of the polling pulse 30.

Figure 2A:
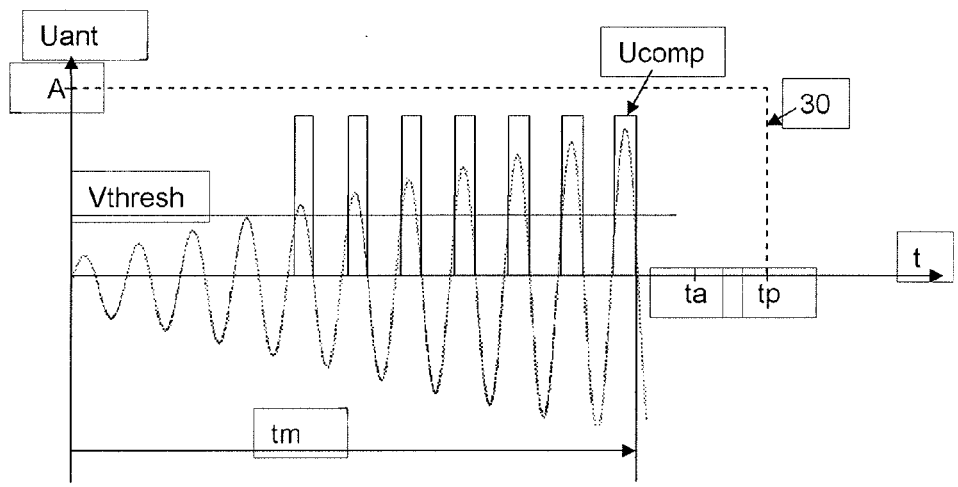
FIG. 2a: shows a graph of a return signal detected at the antenna, during amplitude build-up of the carrier oscillation at the beginning of an electromagnetic field pulse, when there is no device in the electromagnetic field emitted by the antenna.

FIG. 2a illustrates the course of the antenna voltage Uant, representative of the return signal detected at the antenna 4 during the transient amplitude build-up phase [0, ta] of the electromagnetic field pulse 30 associated with the polling signal, in the scenario when no contactless device 2 is present within the communication range of the antenna 4. As the comparative signal Ucomp indicates, in this exemplary scenario, the detection circuit 10 of FIG. 1 detects seven oscillations exceeding the threshold value Vthresh within the time period tm from the beginning of the polling pulse, a number of oscillations which, in the present example, is below the upper threshold value and above the lower threshold value, and thus considered indicative of an absence of a contactless device 2 in the vicinity of the reader 1.

Figure 2B:
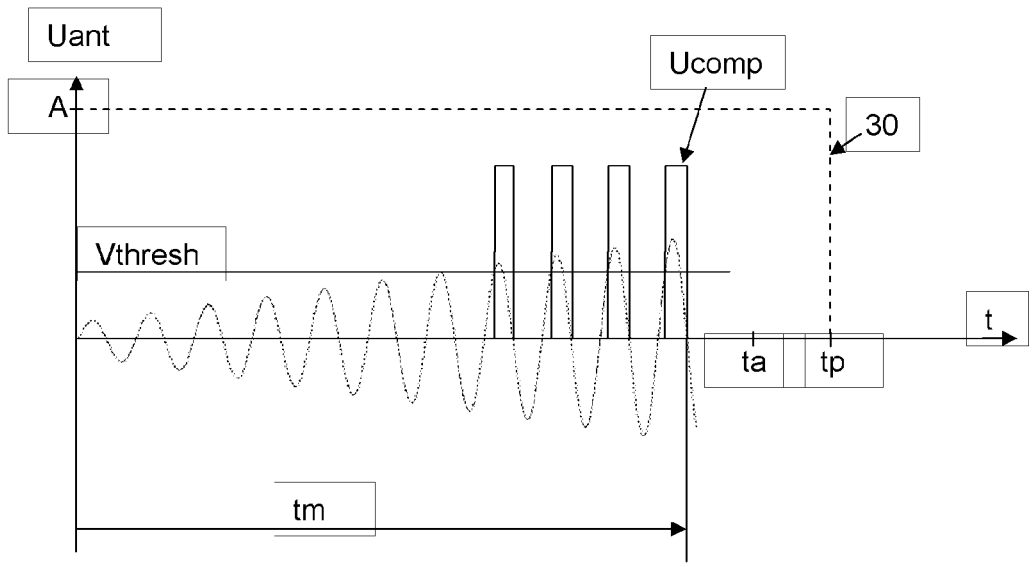
FIG. 2b: shows a graph of the return signal during amplitude build-up when there is a device having an attenuating effect in the electromagnetic field emitted by the antenna.

FIG. 2b illustrates the course of the antenna voltage Uant during the amplitude build-up of the polling pulse, in the scenario when a contactless device 2 with an attenuating effect is present within the communication range of the antenna 4. As the comparative signal Ucomp indicates, in this exemplary scenario, four oscillations exceeding the threshold value Vthresh are detected within the time period tm from the beginning of the polling pulse 30, a number of oscillations which, in the present example, is below the lower threshold value and thus considered indicative of the presence of a contactless device 2 in the vicinity of the reader 1.

Figure 2C:
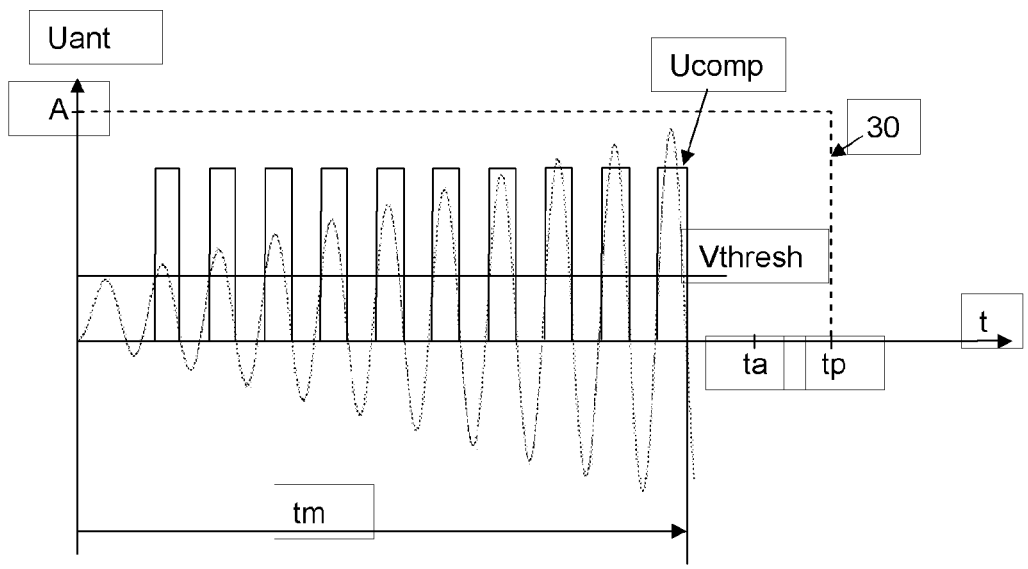
FIG. 2c: shows a graph of the return signal during amplitude build-up when there is a device having a reinforcing effect in the electromagnetic field emitted by the antenna.

FIG. 2c illustrates the course of the antenna voltage Uant during the amplitude build-up of the polling pulse 30, in the scenario when a contactless device 2 with a reinforcing effect is present within the communication range of the antenna 4. As the comparative signal Ucomp indicates, in this exemplary scenario, ten oscillations exceeding the threshold value Vthresh are detected within the time period tm from the beginning of the polling pulse, a number of oscillations which, in the present example, is above the upper threshold value and thus considered indicative of the presence of a contactless device 2 in the vicinity of the reader 1.

In the embodiment of FIG. 3, the detection circuit 10 comprises an input buffer 15, an RC-circuit for connecting the input buffer 15 to the antenna 4, and an Exclusive-Or (XOR) element 16. The XOR element 16 has one of its inputs connected to the output of the input buffer 15, while the other one of its inputs is connected to an oscillator 17 or other source providing an oscillating signal Ufc having a frequency in synch with the oscillations of the electromagnetic field pulse at carrier frequency. The output of the XOR element 16 is connected to an input of the processing unit 13. As shown in FIG. 3, the antenna 4 is connected via capacitor C to the input of the input buffer 15.

The threshold module 11, e.g. a Digital/Analog converter, is connected via resistor R to the input of the input buffer 15 and configured to set an input reference voltage Vin. In a variant, the threshold module 11 is part of the processing unit 13. The input buffer 15 is configured to generate an output signal UantCmos indicating the phasing of the return signal represented by the antenna voltage Uant. For example, the input buffer 15 is configured as a hysteresis input buffer generating a comparative output signal UantCmos with a high output level when the antenna voltage Uant exceeds the comparative value set by the input reference voltage Vin, and a low output level when the antenna voltage Uant reverts to a level at or below the comparative value set by the input reference voltage Vin, e.g. zero.

Figure 4:
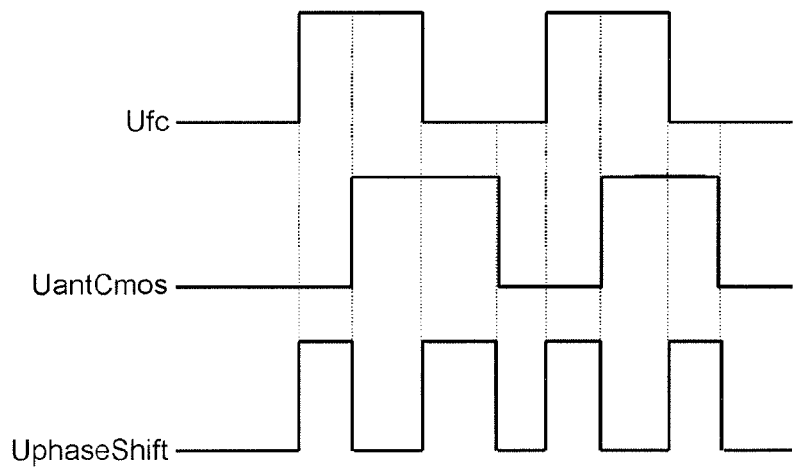
FIG. 4: shows a timing diagram illustrating the course of an oscillating signal representing carrier oscillations of the electromagnetic field pulse, a comparative signal representing the phasing of the return signal detected at the antenna, and a phase shift signal indicating the phase shift between the oscillating signal and the comparative signal.

As illustrated in FIG. 4, the XOR element 16 generates, from the phase-indicating output signal UantCmos and the oscillating carrier frequency signal Ufc, an output signal Uphaseshift which indicates the current phase shift of the return signal with respect to the carrier oscillations of the electromagnetic field pulse 30 associated with the polling signal.

Over a defined period of time, e.g. [0, tm], a mean value of the output signal Uphaseshift is determined, e.g. by the processing unit 13 or by a low-pass filter. The mean value of the output signal Uphaseshift provides a measure and indication of the actual phase shift of the return signal from the original carrier oscillations of the polling pulse 30. Subsequently, the processing unit 13 determines whether or not a contactless device 2 (or another object) is within the antenna's communication range by comparing the mean phase shift value to an upper threshold, indicative of a positive phase shifting effect by an object within the communication range, and to a lower threshold, indicative of a negative phase shifting effect of an object within the communication range.

Figure 5A:
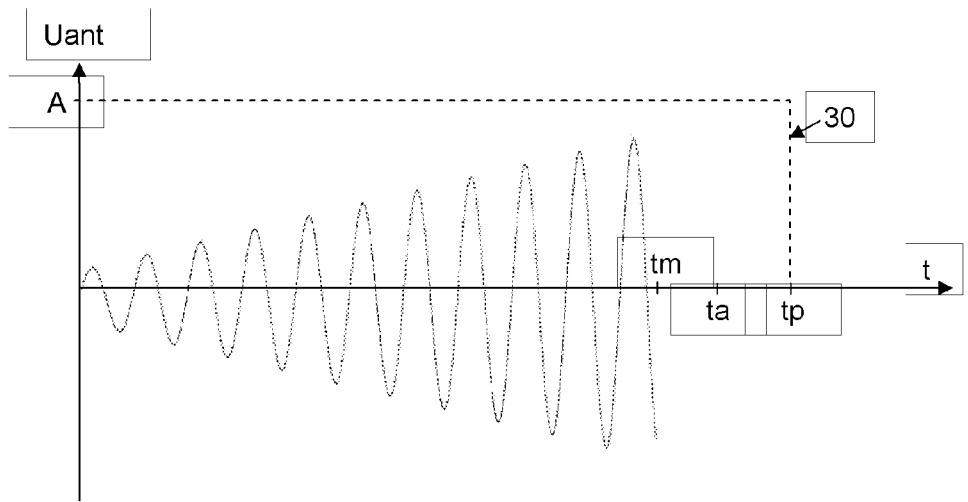
FIG. 5a: shows a graph of the return signal detected at the antenna, during amplitude build-up of the carrier oscillation at the beginning of an electromagnetic field pulse, when there is no device in the electromagnetic field emitted by the antenna.

FIG. 5a illustrates the course of the antenna voltage Uant, representative of the return signal detected at the antenna 4 during the transient amplitude build-up phase [0, ta] of the electromagnetic field pulse 30 associated with the polling signal, in the scenario when no contactless device 2 is present within the communication range of the antenna 4. In this scenario, the mean value of the output signal Uphaseshift has a value of zero, i.e. no phase shift of the return signal, which indicates an absence of a contactless device 2 in the vicinity of the reader 1.

Figure 5B:
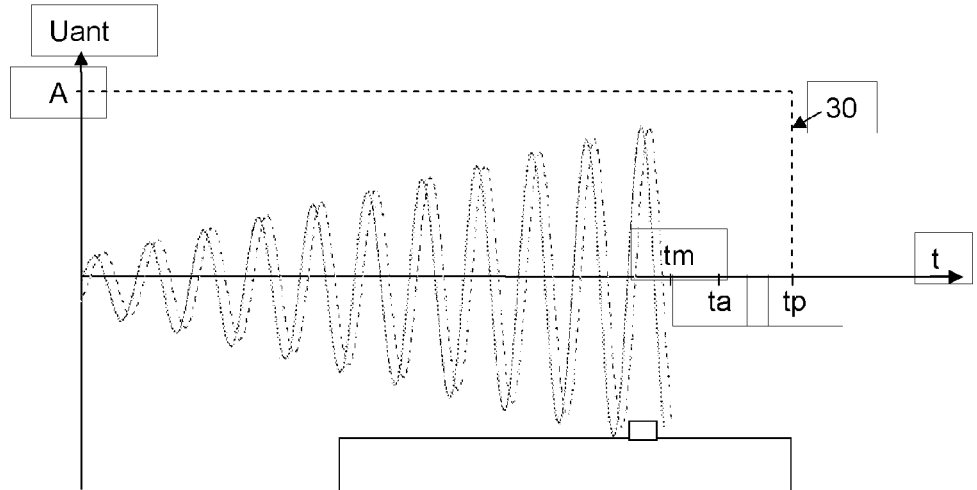
FIG. 5b: shows a graph of the return signal during amplitude build-up when there is a device having a positive phase shifting effect in the electromagnetic field emitted by the antenna.

FIG. 5b illustrates the course of the antenna voltage Uant during the amplitude build-up of the polling pulse 30, in the scenario when a contactless device 2 with a positive phase-shifting effect is present within the communication range of the antenna 4. In this scenario, the mean value of the output signal Uphaseshift has a positive value above the upper threshold value, and, thus, indicates the presence of a contactless device 2 in the vicinity of the reader 1.

Figure 5C:
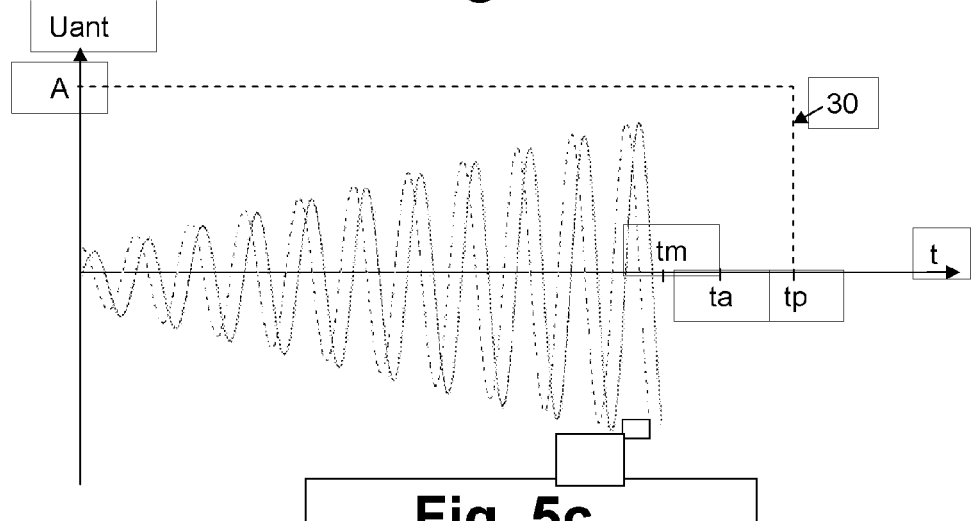
FIG. 5c: shows a graph of the return signal during amplitude build-up when there is a device having a negative phase shifting effect in the electromagnetic field emitted by the antenna.

FIG. 5c illustrates the course of the antenna voltage Uant during the amplitude build-up of the polling pulse 30, in the scenario when a contactless device 2 with a negative phase-shifting effect is present within the communication range of the antenna 4. In this scenario, the mean value of the output signal Uphaseshift has a negative value below the lower threshold value, and, thus, indicates the presence of a contactless device 2 in the vicinity of the reader 1.

Figure 7:
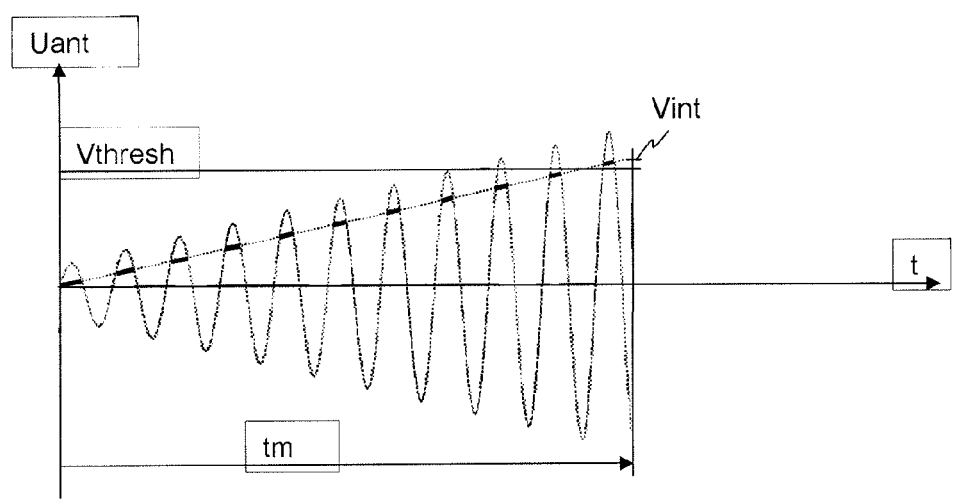
FIG. 7: shows a graph of the return signal detected at the antenna, during amplitude build-up of the carrier oscillation at the beginning of an electromagnetic field pulse, and an evaluation signal generated through current integration which indicates the slope of the amplitude build-up.

In the embodiment of FIG. 6, the detection circuit 10 comprises a Villard circuit VC connecting the antenna 4 to an input of the processing unit 13, specifically, to an input of a Analog/Digital converter 18 of the processing unit 13. The Villard circuit VC comprises capacitors C1 and C2, and diodes D1 and D2, which are configured to transpose the return signal to the operative range of the Analog/Digital converter 18. Moreover, the Villard circuit VC measures the antenna voltage Uant of the return signal by building up a respective charge in capacitor C1. Thus the voltage Vint over the capacitor C1 and at the input of the Analog/Digital converter 18 corresponds to the peak antenna voltage Uant and provides a measure of the slope of the amplitude build-up in the transient phase [0, ta] of the carrier oscillation at the beginning of the electromagnetic field pulse 30 associated with the polling signal, as is illustrated in FIG. 7.

At the end of the defined time period tm, the level of the input voltage Vint is converted by the Analog/Digital converter 18 to a digital value which represents a measure of the slope of the amplitude build-up at the time tm. Subsequently, the processing unit 13 determines whether or not a contactless device 2 (or another object) is within the antenna's communication range by comparing the current value of the input voltage Vint to an upper threshold, indicative of a reinforcing effect of an object within the communication range, and to a lower threshold, indicative of an attenuating effect of an object within the communication range.

If the presence of an object has been detected, the processing unit 13 initiates or triggers the reader 1 to emit an extended electromagnetic field pulse associated with a normal identification/authentication signal, e.g. according to RFID standard protocols.

It is pointed out, that the upper and lower threshold values described above with reference to the detection circuit 10 of FIGS. 1, 3 and 6, are preferably dynamically set depending on experienced and measured values during one or more previous polling pulses 30. Consequently, a contactless device 2 is detected within the communication range of the antenna 4, if the change in slope of amplitude build-up and/or phase shift varies beyond a defined level from the levels determined for the previous one or more polling pulses 30.

Figure 8:
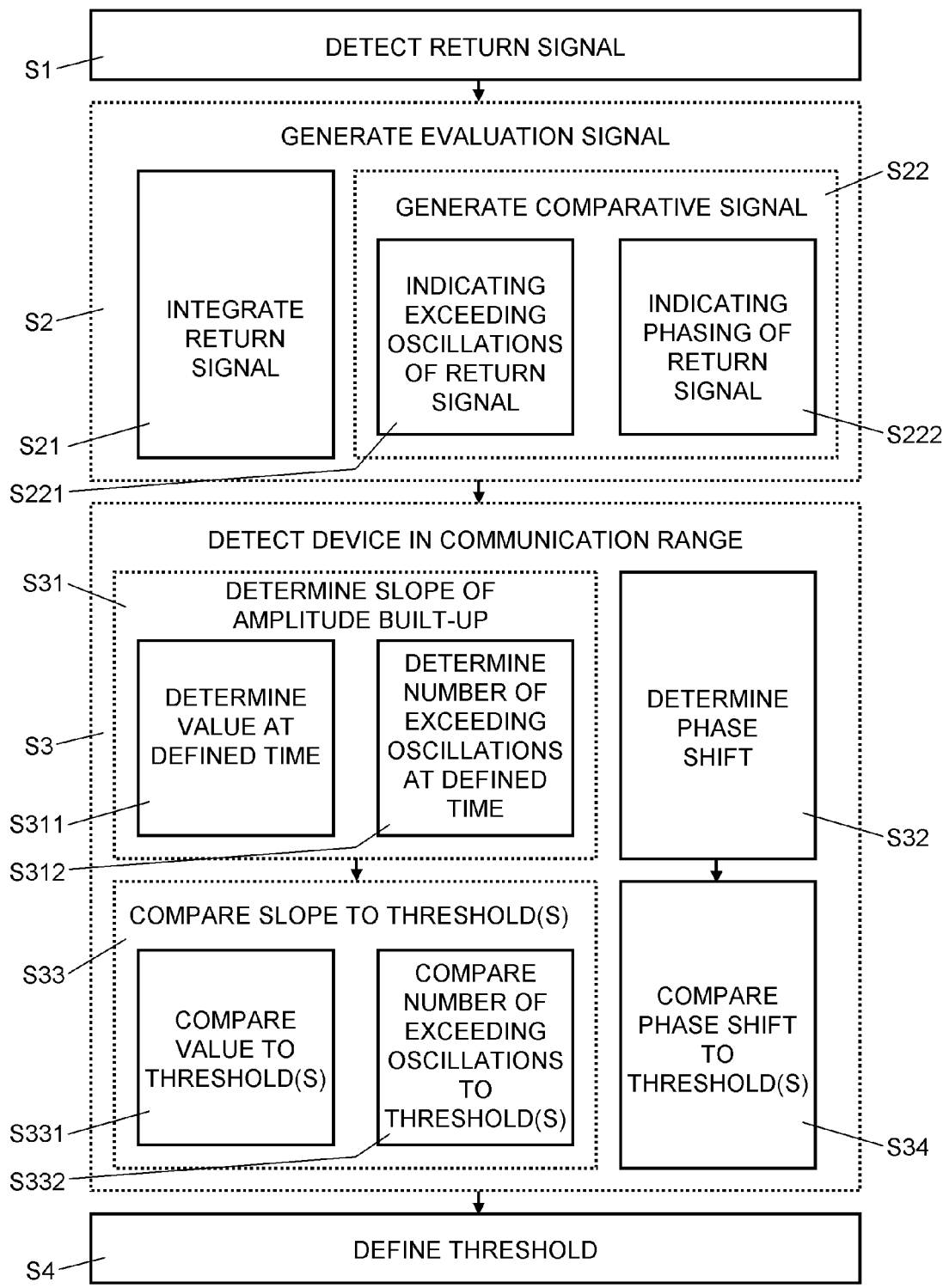
FIG. 8: shows a flow diagram illustrating various exemplary sequences of steps for detecting a contactless data storage device within the communication range of the antenna of the read/write device.

In the following paragraphs, described are exemplary sequences of steps for detecting a contactless data storage device 2 within the communication range of the antenna 4 of the read/write device 1 with reference to FIG. 8. It should be pointed out that steps which are arranged in blocks in a common vertical row are performed in the same embodiment. For example, steps S1-S21-S311-S331-S4 are associated with the detection circuit of FIG. 6, steps S1-S221-S312-S332-S4 are associated with the detection circuit of FIG. 1, and steps S1-S222-S32-S34-S4 are associated with the detection circuit of FIG. 3. Similarly, steps S1-S2-S31-S33-S4 are associated with the detection circuits of FIGS. 1 and 6; whereas steps S1-S22-S3-S4 are associated with the detection circuits of FIGS. 1 and 3.

In step S1, the detection circuit 10 detects a return signal at the antenna 4 during emission of an electromagnetic field pulse 30 which is emitted as a short polling signal.

In step S2, the detection circuit 10 generates an evaluation signal from the return signal detected during the transient amplitude build-up [0, ta] of the carrier oscillation in the beginning of the electromagnetic field pulse 30. Depending on the embodiment, the evaluation signal is generated by integrating the return signal in step S21, or by generating a comparative signal in step S22. The comparative signal is generated to indicate exceeding oscillations in the return signal, in step S221, or to indicate the phasing of the return signal, in step S222.

In step S3, the detection circuit 10 detects a contactless device 2 within the communication range of the antenna 4 based on the generated evaluation signal. Depending on the embodiment, the contactless device 2 is detected by determining, in step S31, the slope of the amplitude build-up in the transient phase [0, ta] of carrier oscillation in the beginning of the electromagnetic field pulse 30, and comparing, in step S33, the slope to lower and upper threshold values; or by determining, in step S32, the phase shift of the return signal during the amplitude build-up [0, ta], and comparing, in step S34, the mean phase shift to lower and upper threshold values. The slope of the amplitude build-up is identified by determining, at a defined point in time, the value of the integrated return signal, in step S311, or the number of exceeding oscillations, in step S312. Correspondingly, the value of the integrated return signal or the number of exceeding oscillations are compared to the upper and lower thresholds, in step S331 or S332, respectively.

In step S4, the detection circuit 10 defines new upper and lower threshold values based on the measurements for the current polling pulse 30, for application in the subsequent, next polling pulse 30.

LIST OF REFERENCE NUMERALS 1 read/write device (reader)
2 contactless data storage device (contactless device)

3 electromagnetic field (pulse)
4 antenna
10 detection circuit
11 threshold module (Digital/Analog converter)
12 counter
13 processing unit (CPU)
14 timer
15 input buffer (with hysteresis)
16 Exclusive-Or (XOR) element 16
17 oscillator
18 Analog/Digital converter
20 antenna coil
30 magnetic field pulse (polling pulse)
A amplitude of stable oscillation
C, C1, C2 capacitor
D1, D2 diode
R resistor
t time
ta amplitude build-up time (rise time)
tm evaluation time (interval)
tp pulse width (length)
Uant antenna voltage
UantCmos phase indicating output signal
Ucomp comparative signal
Ufc carrier frequency signal
UphaseShift phase shift indicating output signal
VC Villard circuit
Vin input reference voltage
Vint slope indicating input voltage
Vthresh threshold voltage
S1-S4 steps

What is claimed is:

1. A detection circuit for detecting, within a communication range of an antenna for emitting an electromagnetic field, a contactless data storage device which is configured for inductive coupling with the electromagnetic field, the detection circuit comprising:
   a circuit for generating an electromagnetic field pulse comprising a carrier signal, wherein said carrier signal has an amplitude build-up which begins at the beginning of the electromagnetic field pulse and continues until the carrier signal reaches a maximum amplitude;
   a connector for connecting electrically the detection circuit to the antenna and for receiving a return signal at the antenna during emission of the electromagnetic field pulse,
   wherein the detection circuit is further configured to generate, entirely during said amplitude build-up of said carrier signal at the beginning of the electromagnetic field pulse, an evaluation signal based on the return signal, and
   to detect the data storage device within the communication range based on the evaluation signal generated during the amplitude build-up and further based on a threshold value.

2. The detection circuit of claim 1, wherein the detection circuit is configured to determine, based on the evaluation signal, the slope of the amplitude build-up, and to detect the data storage device within the communication range based on the threshold value and the slope of the amplitude build-up.

3. The detection circuit of one of claim 1, wherein the detection circuit is configured to generate the evaluation signal as a comparative signal, during amplitude build-up of the carrier signal at the beginning of the electromagnetic field pulse, based on a comparison of the return signal and a comparative value, and to detect the presence of the data storage device based on the comparative signal generated during the amplitude build-up and the threshold value.

4. The detection circuit of claim 3, wherein the detection circuit is configured to generate the comparative signal to indicate exceeding oscillations of the return signal, an exceeding oscillation having an amplitude greater than the comparative value, and to detect the presence of the data storage device based on the number of exceeding oscillations within a defined time interval during the amplitude build-up and the threshold value.

5. The detection circuit of one of claim 1, wherein the detection circuit further comprises: an Analog-Digital-converter and a Villard circuit for connecting the antenna to an input of the Analog-Digital-converter, the Villard circuit being configured to generate the evaluation signal, during the amplitude build-up of the carrier signal at the beginning of the electromagnetic field pulse, through current integration and transposition of the return signal from the antenna to a defined operating range of the Analog-Digital-converter, and the detection circuit is configured to detect the presence of the data storage device based on a digital value generated by the Analog-Digital-converter from the evaluation signal at a defined point in time during the amplitude build-up.

6. The detection circuit of claim 3, wherein the detection circuit is configured to generate the comparative signal to indicate the phasing of the return signal, to determine a phase shift between the comparative signal and carrier signal oscillations of the electromagnetic field pulses, and to detect the presence of the data storage device based on the phase shift and the threshold value.

7. The detection circuit of claim 6, wherein the detection circuit comprises an Exclusive-Or element for generating from the comparative signal and the carrier signal of the electromagnetic field pulses a phase signal indicative of the phase shift between the comparative signal and the carrier signal oscillation of the electromagnetic field pulses, and the detection circuit is configured to determine for an electromagnetic field pulse an average phase shift from the phase signal, and to detect the presence of the data storage device based on the average phase shift of electromagnetic field pulses and the threshold value.

8. The detection circuit of one of claim 1, wherein the detection circuit is configured to detect the data storage device based on an upper threshold value indicative of a reinforcing effect of an object in the communication range, and a lower threshold value indicative of an attenuating effect of an object in the communication range.

9. The detection circuit of one of claims 1, wherein the detection circuit is configured to define dynamically, threshold values depending on the evaluation signal generated during the amplitude build-up of a previously emitted electromagnetic field pulse.

10. A method of detecting, within a communication range of an antenna for emitting an electromagnetic field, a contactless data storage device which is configured for inductive coupling with the electromagnetic field, the method comprising:
    emitting, at the antenna, an electromagnetic field pulse, said electromagnetic field pulse comprising a carrier signal, wherein said carrier signal has an amplitude build-up which begins at the beginning of the electromagnetic field pulse and continues until the carrier signal reaches a maximum amplitude;
    detecting, at the antenna, a return signal during emission of said electromagnetic field pulse, generating, entirely during said amplitude build-up of said carrier signal at the beginning of the electromagnetic field pulse, an evaluation signal based on the return signal, and detecting the data storage device within the communication range based on the evaluation signal generated during the amplitude build-up and further based on a threshold value.

11. The method of claim 10, further comprising:

determining, based on the evaluation signal, the slope of the amplitude build-up, and detecting the data storage device within the communication range based on the threshold value and the slope of the amplitude build-up.

12. The method of one of claim 10, further comprising:

generating the evaluation signal as a comparative signal, during the amplitude build-up of the carrier signal at the beginning of the electromagnetic field pulse, based on a comparison of the return signal and a comparative value, the comparative signal indicating exceeding oscillations of the return signal having an amplitude greater than the comparative value, and detecting the presence of the data storage device based on the number of exceeding oscillations within a defined time interval during the amplitude build-up.

13. The method of one of claim 10, further comprising:

connecting the antenna via a Villard circuit to an input of an Analog-Digital-converter, generating the evaluation signal, during the amplitude build-up of the carrier signal at the beginning of the electromagnetic field pulse, transposing the return signal by the Villard circuit from the antenna to a defined operating range of the Analog-Digital-converter, and detecting the presence of the data storage device based on a digital value generated by the Analog-Digital-converter from the evaluation signal provided at a defined point in time during the amplitude build-up.

14. The method of claim 10, further comprising:

generating the evaluation signal as a comparative signal, during the amplitude build-up of the carrier signal at the beginning of the electromagnetic field pulse, based on a comparison of the return signal and a comparative value, the comparative signal indicating the phasing of the return signal, determining a phase shift between the comparative signal and carrier signal oscillations of the electromagnetic field pulses, and detecting the presence of the data storage device based on the phase shift and the threshold value.

15. The detection circuit of claim 2, wherein the detection circuit is configured to generate the evaluation signal as a comparative signal, during amplitude build-up of the carrier signal at the beginning of the electromagnetic field pulse, based on a comparison of the return signal and a comparative value, and to detect the presence of the data storage device based on the comparative signal generated during the amplitude build-up and the threshold value.

16. The detection circuit of claim 2, wherein the detection circuit comprises an Analog-Digital-converter and a Villard circuit for connecting the antenna to an input of the Analog-Digital-converter, the Villard circuit being configured to generate the evaluation signal, during the amplitude build-up of the carrier signal at the beginning of the electromagnetic field pulse, through current integration and transposition of the return signal from the antenna to a defined operating range of the Analog-Digital-converter, and the detection circuit is configured to detect the presence of the data storage device based on a digital value generated by the Analog-Digital-converter from the evaluation signal at a defined point in time during the amplitude build-up.

17. The method of claim 11, further comprising:

generating the evaluation signal as a comparative signal, during the amplitude build-up of the carrier signal at the beginning of the electromagnetic field pulse, based on a comparison of the return signal and a comparative value, the comparative signal indicating exceeding oscillations of the return signal having an amplitude greater than the comparative value, and detecting the presence of the data storage device based on the number of exceeding oscillations within a defined time interval during the amplitude build-up.

18. The method of one of claim 11, further comprising:

connecting the antenna via a Villard circuit to an input of an Analog-Digital-converter, generating the evaluation signal, during the amplitude build-up of the carrier signal at the beginning of the electromagnetic field pulse, transposing the return signal by the Villard circuit from the antenna to a defined operating range of the Analog-Digital-converter, and detecting the presence of the data storage device based on a digital value generated by the Analog-Digital-converter from the evaluation signal provided at a defined point in time during the amplitude build-up.

* * * * *